(12) United States Patent
Martin

(10) Patent No.: US 6,805,909 B2
(45) Date of Patent: Oct. 19, 2004

US006805909B2

(54) OXIDATION-PROTECTED BRAKE DISK AND METHOD OF MAKING SAME

(75) Inventor: Roland Martin, Aalen (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/195,125

(22) Filed: Jul. 15, 2002

(65) Prior Publication Data

US 2003/0021975 A1 Jan. 30, 2003

(30) Foreign Application Priority Data

Jul. 13, 2001 (DE) .......................................... 101 34 059

(51) Int. Cl.⁷ ................................................ B32D 5/00
(52) U.S. Cl. .................. 427/287; 427/255.11; 427/435; 427/255.14; 427/255.21; 427/302
(58) Field of Search ............................ 427/255.11, 287, 427/435, 532, 318, 255.14, 255.21, 302, 250, 237, 238; 432/250, 237, 238

(56) References Cited

U.S. PATENT DOCUMENTS

| | | | |
|---|---|---|---|
| 5,062,891 A | * | 11/1991 | Gruber et al. .............. 524/296 |
| 6,062,851 A | * | 5/2000 | Rudolph et al. ............. 432/250 |
| 6,136,374 A | | 10/2000 | Reuscher |
| 6,254,975 B1 | * | 7/2001 | Kayser et al. ............ 428/293.4 |
| 6,440,220 B1 | * | 8/2002 | Rudolph ............... 118/723 AN |

FOREIGN PATENT DOCUMENTS

| | | |
|---|---|---|
| DE | 2540083 | 3/1976 |
| DE | 2653665 | 6/1977 |
| DE | 19616217 | 10/1997 |
| DE | 69506653 | 7/1999 |
| DE | 19834542 | 2/2000 |
| DE | 4438455 | 7/2000 |
| EP | 0913373 | 5/1999 |
| EP | 1251289 | 10/2002 |

OTHER PUBLICATIONS

Haug, et al., "Method for manufacture of oxidation–resistant fiber–reinforced ceramics" Verfahrenstech Symposium, 1997, pp. 943–955.
European Search Report.

* cited by examiner

*Primary Examiner*—Merrick Dixon
(74) *Attorney, Agent, or Firm*—Crowell & Moring LLP

(57) ABSTRACT

An oxidation-protected brake disk is made of a fiber-reinforced ceramic material. A method of producing such a brake disk comprises applying at least one paint layer to a brake disk. In order to reduce damage to the brake disk under extreme thermal stress, the brake disk is provided with a layer of a highly temperature-stable paint that is viscous at the operating temperature of the brake disk.

12 Claims, 3 Drawing Sheets

OXIDATION-PROTECTED BRAKE DISK AND METHOD OF MAKING SAME

BACKGROUND AND SUMMARY OF THE INVENTION

This application claims the priority of German Patent Document DE 101 34 059.1, filed on Jul. 13, 2001, the disclosure of which is expressly incorporated by reference herein.

The invention relates to an oxidation-protected brake disk made of a fiber-reinforced ceramic material, a paint for use on such a brake disk, and a method of producing such a brake disk.

Brake disks made of a fiber-reinforced ceramic material are known from German Patent Documents DE 44 38 455 C1 and DE 198 34 542 A1. German Patent Document DE 44 38 455 C1 shows a method of producing a friction unit, in which a porous carbon body is infiltrated with liquid silicon. In the process, the silicon converts with the carbon to silicon carbide (SiC). The carbon body is preferably constructed as a carbon fiber body. If the friction unit, here, a brake disk, is assembled of two halves, recesses can be made in the carbon bodies before the ceramization, which recesses complement one another upon assembly of the carbon body and form a joint cavity, for example, a cooling duct.

German Patent Document DE 198 43 542 A1 also discloses a method of producing bodies which contain reinforcing fibers. In contrast to German Patent Document DE 44 38 455 C1, fibers, fiber bundles or fiber agglomerates are used and aligned such that the reinforcing fibers in the area of the recesses in the brake disk are oriented approximately parallel to the lateral edges of the recesses. Brake disks made of a fiber-reinforced ceramic material are largely stable with respect to environmental influences. Only a slight wear can be determined during the operation.

One source for various protective paints for carbon materials is Ceramic Solutions, Inc. of Hawthorne, U.S.A. Their primer paint (Designation: CSP-2) is produced on the basis of phosphates and forms an oxidation protection for carbon surfaces. This paint penetrates into the surface porosities and reduces the rate of oxidation. The primer paint is used as a base coat for a cover paint, which is also available from Ceramic Solutions. These cover paints can be used for operating temperatures of up to 927° Celsius or 1149° Celsius. They have a high stability with respect to water, water vapor and salts of the alkali metals. They are ceramics-based and form a barrier that prevents the oxidation of carbon. They are available in connection with the described primer paint for use on graphite, carbon and carbon/composite materials in order to prevent oxidation.

Ceramic Solutions further offers a protective paint whose operating temperature range is up to 1260° C. This paint is extremely stable with respect to water and water vapor and also withstands attacks by salts of the alkali metals. This protective paint is a ceramics-based sealing material that prohibits the oxidation of carbon and other ceramic phases. This protective paint is recommended for use on ceramic composite materials containing carbon or other phases susceptible to active oxidation. This protective paint is recommended as a sealant over a primary protective layer (for example, SiC, $Si_3N_4$, and oxides).

It is an object of the invention to reduce or, if possible, to completely avoid damage to the brake disk.

The invention is based on the surprising recognition that, contrary to previous assumptions, brake disks made of fiber-reinforced ceramics, despite the fact that ceramics are very stable per se, require oxidation protection in order to be stable with respect to oxidation under operating conditions, such as those that occur in the case of vehicles.

With respect to the device, it is suggested that the brake disk be provided with a layer of a highly temperature-stable paint which is viscous at the operating temperature of the brake disk. The high temperature stability of the paint is required so that the paint will not be destroyed at temperatures of more than 1,100° C. that occur during the braking operation. However, it is an important characteristic of the paint that it becomes viscous in the operating temperature range of the brake disk; that is, that the glass temperature of the paint is below the operating temperature of the brake disk, and the paint is therefore in a viscoplastic to flexible condition until its melting temperature is reached. Advantageously, this behavior has the result that a closed paint film is always formed and the entrance of oxygen to the brake disk is hindered or even prevented. Damage to the paint layer, for example, by the formation of cracks, can also be cured in this manner. It is preferably provided that the paint is temperature-stable to at least 1,200° C. and becomes viscous above approximately 400° C.

According to a further development of the invention, it may be provided that additional coloring pigments, such as aluminum oxide, be added to the paint. These pigments should have a temperature stability that is comparable to that of the base coat. By using such coloring pigments, it is possible to visually contrast the paint layer from the brake disk and make it visible. For example, brake disks provided with a lacquer coat may thereby be marked in a special manner.

It is particularly advantageous for the coloring pigments to be thermally unstable and to cause a color change when a specific limit temperature is reached. By using such coloring pigments, it is possible to indicate the exceeding of limit temperatures defined by the selection of coloring pigments. Such an indication can be used in order to indicate an overstressing of the brake disk so that, for example, during the next inspection of the vehicle, this overstressing is recognized and an exchange of the brake disks is initiated.

Advantageously, the friction surface of the brake disk as well as the contact surfaces of the brake disks to other components, such as a barrel of the brake disk or fastening elements of the brake disk, are not covered by a paint layer. On the one hand, the frictional characteristics of the brake disk should not be changed; on the other hand, contact surfaces of the brake disk are not freely exposed to oxygen so that the danger of oxygen entry is minimal.

With respect to the use, the object is achieved in that a highly temperature-stable paint, which is viscous at the operating temperature, is applied to a brake disk made of a fiber-reinforced ceramic material.

With respect to the process, it is provided in a supplementary manner that a highly temperature-stable paint, which is viscous at the operating temperature of the brake disk, is applied to a brake disk made of a fiber-reinforced ceramic material. If the friction surface as well as possibly existing contact surfaces are not supposed to be covered by paint, it is also suggested that these surfaces be covered during the application of the paint. According to an alternative embodiment of the invention, it is suggested that these surfaces also be painted and mechanically treated after the painting. This approach has the advantage that additional painting methods can be used, such as dip-coating. This process ensures that paint residues do not reach friction surfaces or contact surfaces, for example, by creeping under a covering. The mechanical stripping of the paint coat may advantageously take place together with a finishing of the friction surfaces or of the contact surfaces.

Other objects, advantages and novel features of the present invention will become apparent from the following detailed description of the invention when considered in conjunction with the accompanying drawings.

DETAILED DESCRIPTION OF THE DRAWINGS

Figure 1:
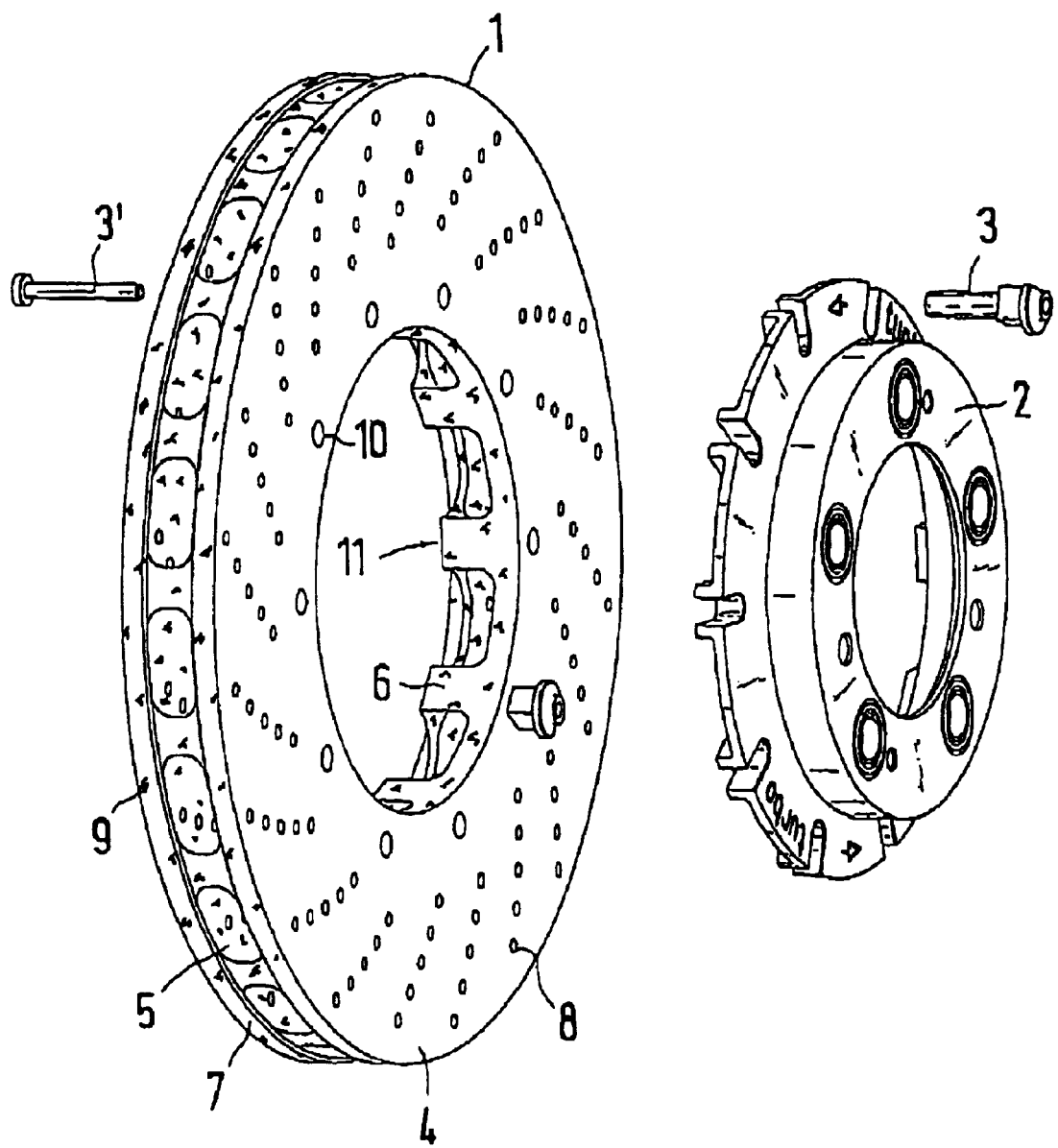
FIG. 1 is a view of a brake disk made of a fiber-reinforced ceramic material.
Figure 2:
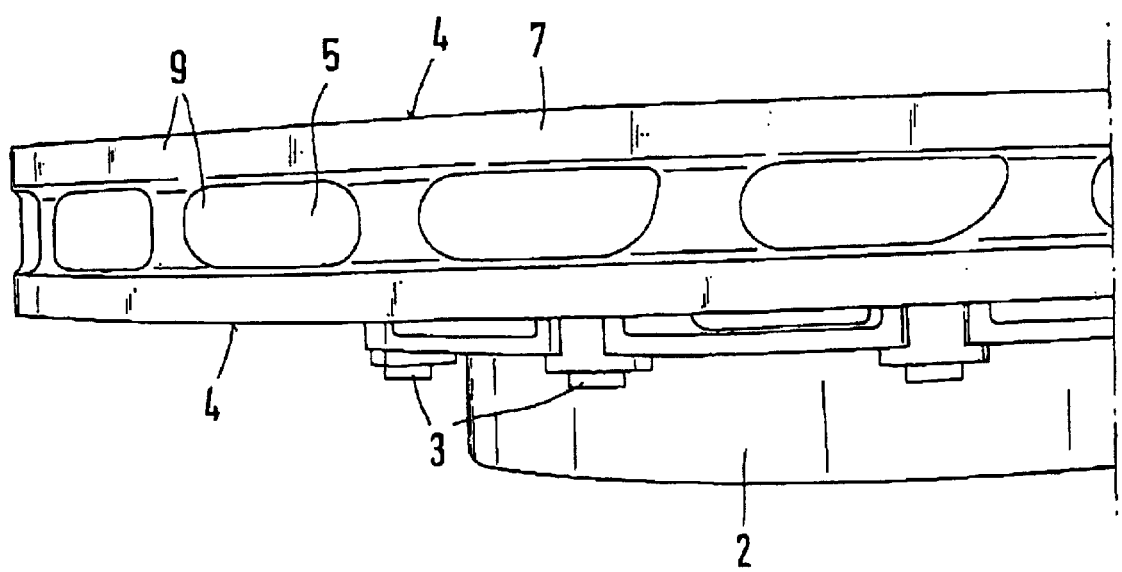
FIG. 2 is a lateral detailed view of the brake disk.
Figure 3:
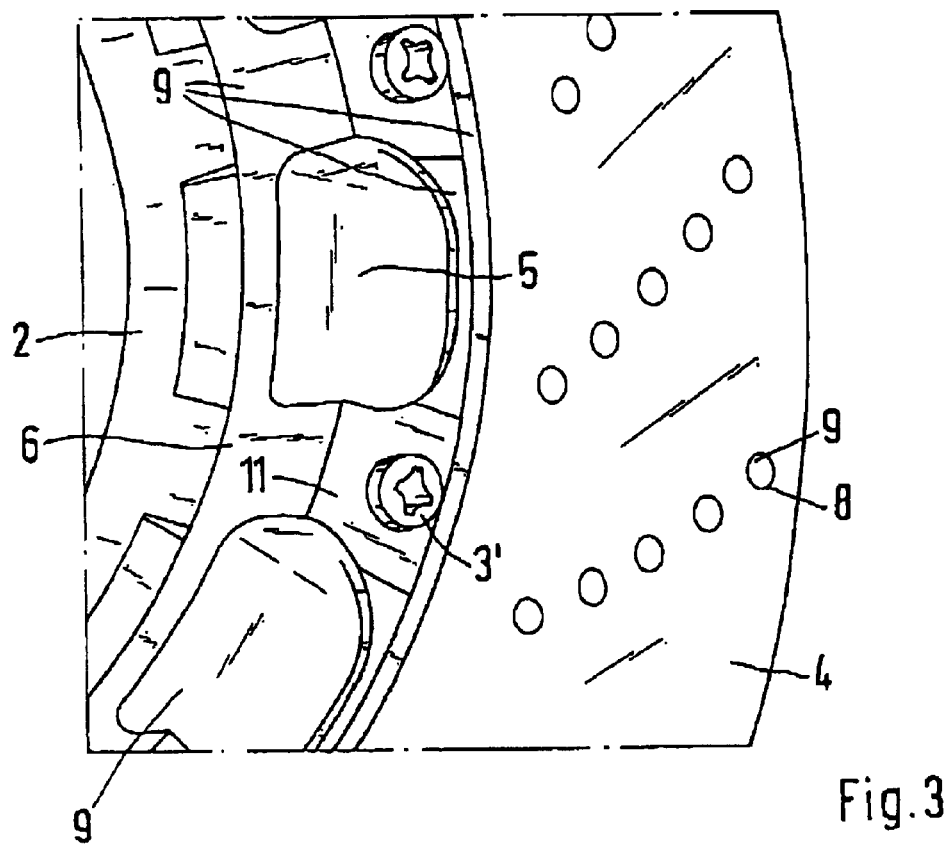
FIG. 3 is a detailed view of the interior surface of the brake disk.
Figure 4:
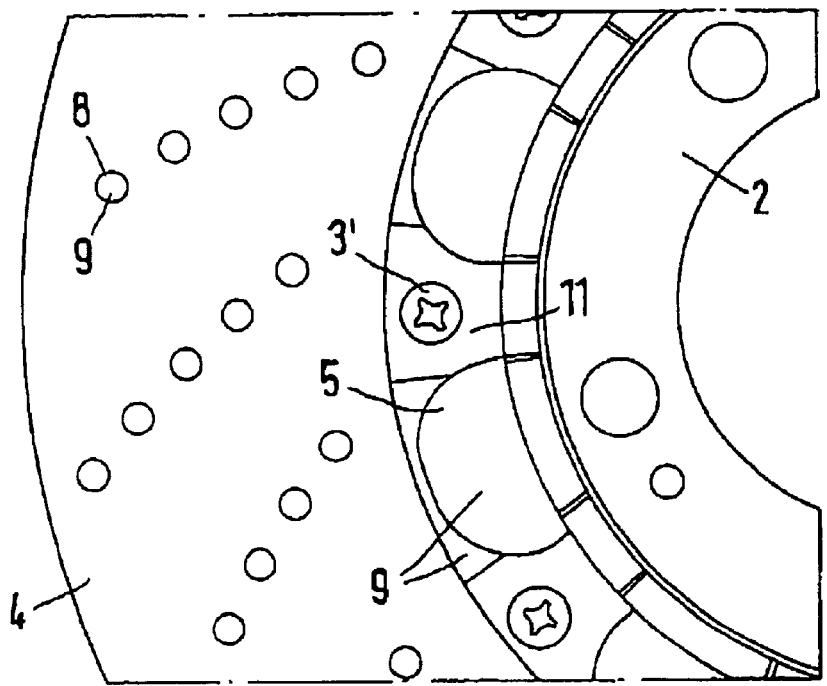
FIG. 4 is a detailed view of the friction surface with bores.

The brake disk illustrated in FIG. 1 consists of a friction ring 1 (also referred to as a brake ring) and a brake barrel 2. The friction ring 1 and the brake barrel 2 are mutually connected by fastening elements 3. The fastening elements 3 are guided in the brake barrel 2 such that different thermal expansions of the brake ring 1 and of the brake barrel 2 are compensated.

The brake ring 1 consists of a fiber-reinforced ceramic material, more precisely of carbon-fiber-reinforced silicon carbide (C/CSiC). The brake barrel 2, fastening elements 3, and with screws 3' consist of special steel.

On the exterior side, the brake ring 1 has two friction surfaces 4 which are in contact with friction linings (not shown). Normally, the illustrated brake disk is used for a partial-lining disk brake system; that is, the friction linings each only cover a portion of the friction surfaces 4.

For better cooling of the brake disk, cooling ducts 5 are provided inside the friction ring 1. Cooling ducts 5 extend from an inner circumference 6 involutely to an outer circumference 7. Originating from the friction surface 4, bores 8 are also provided which extend into the cooling ducts 5.

For protection against oxygen entrance, the brake disk is provided with a paint coat 9. The paint coat 9 covers the outer circumference 7 of the brake disk, the inner circumference 6 of the brake disk, the cooling ducts 5 as well as the bores 8. The friction surfaces 4, including contact surfaces 10 to the brake barrel 2, here also contact surfaces 11 to heads of the screws 3', are not covered by the paint coat 9. In the present example, the paint coat 9 has an overall thickness of 200 μm +/−100 μm.

To apply the paint coat 9, the friction surfaces 4 as well as the contact surfaces 10, 11 are first covered with correspondingly cut, self-adhesive foils which are not shown here. Subsequently, in a first operation, the brake disk is provided with a primer layer 12 (paint with the designation "CSP-2" from Ceramic Solutions, Inc., U.S.A.), which has the following composition:

| | |
|---|---|
| inorganic phosphate | 2 to 15% |
| acetic acid | 15 to 30% |
| ammonium nitrate | 8 to 20% |
| water | 40 to 70% |

After the application, the primer layer 12 is dried, for example, in a furnace. Subsequently, the cover layer 13 (paint with the designation "CSD1550D" from Ceramic Solutions, Inc., U.S.A.) is applied which has the following composition:

| | |
|---|---|
| metal oxides | 50 to 70% |
| organic solvent | 20 to 45% |
| silicone resin | 5 to 15% |

The cover layer 13 is then also dried.

The paint coat 9 becomes viscous during the operation of the brake disk and dissolves to form a continuous layer which penetrates into all uneven portions of the surface of the friction ring 1. Cracks which may occur in the paint layer 9 are closed again during the next heating; that is, during the next braking operation by the running of the softened paint layer 9.

Additional coloring pigments, such as metal oxides, may be admixed to the cover layer 13. These coloring pigments have the purpose of making the paint layer 9 more visible with respect to the color. Such a coloring is visible particularly at the outer circumference 7 of the brake disk, but surprisingly also in the bores 8.

Using the coloring pigments, the paint layer 9 may be constructed such that it takes over the function of a stress indicator; that is, depending on the adjustment of the coloring pigments in the paint layer 9, the thermal stressing of the brake disk can be recognized by a color change.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of producing an oxidation-protected brake disk, comprising coating a brake disk with a high-temperature-stable paint, wherein the brake disk is made of a fiber-reinforced ceramic material; and where said paint is viscous at the operating temperature of the brake disk.

2. A method according to claim 1, wherein said paint has a glass temperature of above approximately 400° C., and wherein said paint is temperature-stable up to approximately 1,200° C.

3. A method according to claim 1, wherein said paint has a base comprising a magnesium-borosilicate compound.

4. A method according to claim 1, wherein said paint further comprises coloring pigments.

5. A method according to claim 4, wherein said coloring pigments are temperature sensitive.

6. A method according to claim 5, wherein said coloring pigments change color when a specific temperature limit is exceeded.

7. A method according to claim 1, wherein said paint does not cover a friction surface or a contact surface of the brake disk.

8. A method according to claim 7, wherein said friction surface and said contact surface of the brake disk are covered during said coating with paint step.

9. A method according to claim 7, further comprising mechanically treating said friction surface and said contact surface of the brake disk after said coating with paint step.

10. A method of making an oxidation-resistant brake disk, comprising:

forming a brake disk of fiber-reinforced ceramic material, said brake disk having friction surfaces, contact surfaces, non-friction surfaces, and non-contact surfaces; and applying a coating to said non-friction and non-contact surfaces, wherein said coating comprises a high temperature-stable material which is viscous at high temperature.

11. A method according to claim 10, wherein said coating is paint.

12. A method according to claim 10, further comprising:

applying said coating to at least one of said friction surfaces and contact surfaces; and subsequently mechanically treating said at least one of said friction surfaces and contact surfaces.

* * * * *